(12) United States Patent
Underwood

(10) Patent No.: US 10,309,581 B2
(45) Date of Patent: Jun. 4, 2019

(54) MULTIPOD WITH VARIABLE INDEPENDENTLY ANGULARLY ARTICULATING LOCKABLE LEGS

(71) Applicant: DEEP BLUE DESIGN, LLC, Scarborough, ME (US)

(72) Inventor: Stephen N. Underwood, Scarborough, ME (US)

(73) Assignee: Deep Blue Design, LLC, Cape Elizabeth, ME (US)

( * ) Notice: Subject to any disclaimer, the term of this patent is extended or adjusted under 35 U.S.C. 154(b) by 71 days.

(21) Appl. No.: 15/523,281

(22) PCT Filed: Oct. 5, 2015

(86) PCT No.: PCT/US2015/054053
§ 371 (c)(1),
(2) Date: Apr. 28, 2017

(87) PCT Pub. No.: WO2016/069210
PCT Pub. Date: May 6, 2016

(65) Prior Publication Data
US 2017/0370517 A1    Dec. 28, 2017

Related U.S. Application Data

(60) Provisional application No. 62/072,084, filed on Oct. 29, 2014, provisional application No. 62/157,337, filed on May 5, 2015.

(51) Int. Cl.
*F16M 13/00* (2006.01)
*F16M 11/32* (2006.01)
(Continued)

(52) U.S. Cl.
CPC ............. *F16M 11/32* (2013.01); *F16B 7/105* (2013.01); *F16M 11/041* (2013.01);
(Continued)

(58) Field of Classification Search
CPC ...... F16M 11/16; F16M 11/32; F16M 11/247; F16M 11/22; F16M 11/24; F16M 11/10
(Continued)

(56) References Cited

U.S. PATENT DOCUMENTS

| 513,058 A | 1/1894 | Rahmer |
| 2,794,612 A | 6/1957 | Clifton |

(Continued)

OTHER PUBLICATIONS

International Search Report and Written Opinion of corresponding PCT application of the same title, dated Mar. 18, 2016, serial No. PCT/US2015/054053, filed Oct. 5, 2015, 13 pp.
(Continued)

*Primary Examiner* — Todd M Epps
(74) *Attorney, Agent, or Firm* — Chris A. Caseiro; Caseiro Burke, LLC

(57) ABSTRACT

A multipod apparatus and a monopod tip apparatus are described. The multipod apparatus includes a plurality of legs, each of the plurality of legs formed as a leg assembly wherein each leg assembly includes an upper leg section and a lower leg section, a base coupled to the upper leg sections of the plurality of legs and including a leg lock plate and a securing mechanism engaged with the leg lock plate of the base and configured to apply pressure to the leg lock plate so as to secure each of the plurality of legs at a desirable angle. The monopod tip apparatus includes a monopod tip including a cap section and a base section and a concealable stud, wherein the cap section includes a tip cap hingedly connected to a cap body and arranged to conceal the concealable stud therein.

14 Claims, 20 Drawing Sheets

(51) Int. Cl.
*F16M 11/16* (2006.01)
*F16B 7/10* (2006.01)
*F16M 11/04* (2006.01)
*F16M 11/08* (2006.01)
*F16M 11/28* (2006.01)
*F16M 11/36* (2006.01)
*G03B 17/56* (2006.01)
*F16M 11/24* (2006.01)

(52) U.S. Cl.
CPC ............ *F16M 11/08* (2013.01); *F16M 11/16* (2013.01); *F16M 11/245* (2013.01); *F16M 11/28* (2013.01); *F16M 11/36* (2013.01); *G03B 17/561* (2013.01); *F16M 2200/024* (2013.01); *F16M 2200/028* (2013.01)

(58) Field of Classification Search
USPC .................................................. 248/168, 423
See application file for complete search history.

(56) References Cited

U.S. PATENT DOCUMENTS

| | | | |
|---|---|---|---|
| 3,445,082 A | 5/1969 | Proctor et al. | |
| 4,015,806 A | 4/1977 | Cattermole | |
| 4,309,099 A | 1/1982 | Flint | |
| 4,317,552 A * | 3/1982 | Weidler | F16M 11/16 211/203 |
| 4,909,617 A | 3/1990 | Boyd | |
| 5,003,328 A | 3/1991 | Gaynor | |
| 5,823,491 A * | 10/1998 | Lindsay | F16M 11/16 248/169 |
| 7,182,303 B2 | 2/2007 | Speggiorin | |
| 7,222,827 B2 | 5/2007 | Crain et al. | |
| 8,485,488 B2 | 7/2013 | Forrest et al. | |
| 8,584,995 B2 | 11/2013 | Russell | |
| 9,169,958 B2 * | 10/2015 | Yan | F16M 11/00 |
| 2005/0207749 A1 | 9/2005 | Barker et al. | |
| 2006/0039743 A1 | 2/2006 | Mensink et al. | |
| 2007/0290104 A1 | 12/2007 | Denison et al. | |
| 2010/0218670 A1 | 9/2010 | Keng | |
| 2010/0282926 A1 | 11/2010 | Shen | |
| 2011/0239913 A1 | 10/2011 | Chung et al. | |
| 2013/0026315 A1 | 1/2013 | Lee | |
| 2013/0264810 A1 * | 10/2013 | Carr | A63C 11/222 280/821 |
| 2013/0287386 A1 | 10/2013 | Xu | |

OTHER PUBLICATIONS

"Manfrotto compact aluminum Monopod," (online), retrieved Apr. 28, 2017, URL: http://www.bedfords.com/mmcompact-bk, Oct. 10, 2014, 5 pp.

* cited by examiner

MULTIPOD WITH VARIABLE INDEPENDENTLY ANGULARLY ARTICULATING LOCKABLE LEGS

CROSS REFERENCE TO RELATED APPLICATION

The present application is a nonprovisional application claiming the priority benefit of: 1) U.S. provisional application Ser. No. 62/072,084 filed Oct. 29, 2014, entitled "Tripod with variable independently angularly articulating locking legs"; and 2) U.S. provisional application Ser. No. 62/157,337 filed May 5, 2015, entitled "Monopod tip with concealable threaded stud." Both applications are from the same inventor and owned by a common assignee. The entire content of both applications is incorporated herein by reference.

BACKGROUND OF THE INVENTION

1. Field of the Invention

The present invention relates to maneuverable supports. More particularly, the present invention relates to multi-leg and single-leg supports that may be positioned in selectable locations. Still more particularly, the present invention relates to monopods, tripods and other multipods.

2. Description of the Prior Art

Originally, multipod support structures, such as tripods, were typically made with legs that splayed out symmetrically into a fixed position. If they were built to be extendable, the means for securing the telescoping legs was an arrangement of multiple twist collars, or some variation of flip-levers to lock the legs in a chosen position. The amount of time required to set up prior products with three, four or five twist collars per leg to their fully extended position and return them to the closed position often caused users to miss the unfolding action. In addition, twist locking legs tended to slip if not tightened adequately, or even if tightened substantially, the addition of liquids onto and into components allowed for slippage causing the tripod to become unstable and fall over, potentially damaging expensive equipment. Traditional tripods were also susceptible to upset since their center of gravity is typically high and they contained no means to secure them to objects, surfaces or substrates. Even with non-skid leg tips, they were vulnerable to unintended movement when bumped. Moreover, if the surface they were set upon was tilted, shifting or moving, the propensity for tipping was increased.

Nevertheless all of the multipod structures heretofore known suffer from a number of disadvantages. First, the angle of each leg when set up is typically the same, or limited to a few predetermined additional angles. Second, they cannot easily be secured to objects, surfaces or substrates at the foot point or other body locations. Third, they are not waterproof, weatherproof or rustproof. Fourth, only one camera or accessory can be attached to the single mounting stud. Fifth, they require the twisting of three to sometimes fifteen collars to extend and retract them. Sixth, they are not a compact size when folded for storage. Seventh, the legs are not able to swing through a broad range of articulations independent of one another. Eighth, they are not user serviceable if a part is broken. A better multipod support structure is desirable.

Apart from multipods such as tripods, monopods are a popular camera accessory used to help stabilize a camera by screwing it onto a stud at the end of a column, either of fixed length or telescoping style. The monopod column is steadied by the user when in use to support the weight of the camera and to reduce camera shake. The typical monopod design consists of a platform with a single protruding threaded stud, a pole of either fixed length or telescoping, and a tip made of rubber or other material that rests on the ground or other solid surface. The function of present monopod designs is limited by the sole threaded stud that is provided on the platform end. A better stud configuration for camera attachment is desirable.

SUMMARY OF THE INVENTION

Limitations of prior multipod configurations are overcome or alleviated by the present invention, which permits the angular position of attached legs to be set independently relative to one another through the application of pressure by a single central locking mechanism. According to an embodiment of the present invention, the multipod center support enclosure is formed of two interlocking half shells, and defining multiple pivotable receptacles providing connection to multiple multi-stage telescoping leg assemblies and a leg locking plate with a means of applying and releasing pressure to leg end pivot points. It is therefore one of the objects of the present invention to obviate the disadvantages of prior art multipods and their associated locking devices and to provide a multipod which can be deployed and folded without the user having to operate more than a single locking device. A further object is to provide a multipod which has a low self-weight relative to its extended height and the weight of the supported load. The above-discussed and other features and advantages of the presently described multipod will be appreciated and understood by those skilled in the art from the following detailed description and drawings.

The present invention provides a multipod support structure, such as a tripod, which is made with a single central securing knob, legs which can be locked at a broad range of asymmetrical angles with pressure applied by a single knob and can be freed to extend and contract with a single press of a lever. Rotatable spoon-shaped feet, rotatable stakes and multiple anchoring points at head, mid-section and foot points allow the multipod to be secured to a variety of surfaces, substrates and objects. Accordingly numerous advantages of one or more aspects of the present invention are as follows: to provide multipods that are extremely versatile in their height setup, angular setup, orientation setup, and extension setup variations, that can be locked in place with the use of a single central locking knob and leg extension levers, that can be secured by staking into various materials and substrates, that can be hung off and attached to various objects, structures and surfaces, that can be anchored at multiple securing points using rope, line, string, bungee, tie wraps, duct tape, that is constructed of fully waterproof materials, that can accommodate more than one camera or accessory at a time, that is lightweight, that is compact when folded for storage, and that is fully user serviceable. Other advantages of one or more aspects of the multipod of the present invention will be apparent from a consideration of the drawings, ensuing description and associated claims.

The invention provides an apparatus with multiple variably pivoting, individually articulating, locking legs comprising a center support enclosure for supporting a load, provided with pivotable receptacles providing connection to at least three leg assemblies each accepted by said pivotable receptacles which are locked and unlocked via pressure from a leg locking plate provided with a means of applying and releasing pressure to the leg end pivot points. The apparatus as described with the addition of a leg length adjustment mechanism using an array of detent impressions or a track embedded into the leg, and an arm, tip, plug or other structure to permit or halt the extension at a given length. The apparatus as described with the addition of a rotatable spoon or other shaped foot attached to the aforementioned leg. The apparatus as described with the addition of an articulating stake-shaped, talon-shaped, spike-shaped or similarly shaped tip. The apparatus as described with the addition of a single leg locking mechanism that locks three or more legs at angles independent of one another.

The present invention further provides an apparatus for supporting a component, the apparatus comprising a plurality of legs, each of the plurality of legs formed as a leg assembly wherein each leg assembly includes an upper leg section and a lower leg section, a base coupled to the upper leg sections of the plurality of legs and including a leg lock plate and a securing mechanism engaged with the leg lock plate of the base and configured to apply pressure to the leg lock plate so as to secure each of the plurality of legs at a desirable angle. The securing mechanism may be engaged with the leg lock plate through a rotatable shaft and wherein the securing mechanism is a threaded knob coupled to the rotatable shaft. The leg lock plate may engage the upper leg with interlocking gear teeth. The base may be a clamshell base formed of a top clamshell base and a bottom clamshell base. The clamshell base may form a pivotable receptacle for each of the plurality of legs. The upper leg section of each of the plurality of legs terminates in an axle configuration that is pivotable within the clamshell base. Each of the leg assemblies further includes an upper leg washboard track, a leg length adjuster collar, a length adjuster tab, a leg length adjuster pin and a leg length adjuster spring. Each of the upper leg washboard tracks includes a plurality of depressions and wherein the leg assemblies are operated by depressing the tab to disengage the tab from the upper leg washboard track allowing for lower leg length adjustment and releasing the tab into a selectable one of the washboard track depression to secure the leg in a chosen position. The upper leg washboard track may be formed by any of a series of detents, raised ridges or protrusions. It is noted that each lower leg section of each leg assembly may include a spoon foot. Each such may be coupled to the lower leg with a spoon foot pivot assembly that is configured to allow the spoon foot to be pivoted to various angles. The apparatus may include a pivot stake coupled to each spoon foot. The pivot stake may be a triangular spike with an elongated teardrop slot. Alternatively, the pivot stake may be a triangular spike with an elongated teardrop slot and a plurality of retaining ports. The plurality of retaining ports includes one or more threaded ports and one or more unthreaded ports.

The present invention also provides a replacement tip for a monopod. The tip of the present invention includes a tip cap that flips off and away to reveal a second threaded stud. With a second threaded stud at the opposite end of the threaded stud already provided on the monopod, the monopod can then be used as an extension pole by screwing the threaded studs into threaded holes of other pieces of equipment that provide such holes, or by the use of female to female adapters. The threaded tips may also be used to secure two different cameras or accessories on opposite ends of the monopod at the same time. The tip cap of the present invention is attached to the monopod via a cord, strap or tether for safe keeping and to prevent loss of the tip cap. Holes are also provided around the sides of the monopod tip base which exit through the bottom of the monopod tip base. This allows for the passage of string, cord, line, elastic, bungee or other materials to be threaded through the hole and tied off to stabilize the monopod more completely when desired.

This form of the invention may be characterized as an apparatus for securing a component to a monopod base, the apparatus comprising a monopod tip including a cap section and a base section and a concealable stud, wherein the cap section includes a tip cap hingedly connected to a cap body and arranged to conceal the concealable stud therein. The cap may be configured for frictional fit insertion into an interior of a top side of the base section. The base section includes a bottom side stud arranged for removable engagement with a top surface of a monopod. The base section may further include one or more base portals configured to allow for the passage of string, line, rope, elastic, bungee and other flexible materials to secure the monopod tip to the monopod when deployed on the monopod. An underside of the cap section includes engagement wedges arranged for frictional fitting into cavities of the base section when the two sections are pressed together.

These and other features and advantages of the invention may be seen in review of the accompanying drawings, detailed description and appended claims.

BRIEF DESCRIPTION OF THE DRAWINGS

FIG. 5D is a top view of the alternative pivoting stake of FIG. 5C.

DETAILED DESCRIPTION OF THE INVENTION

Figure 1A:
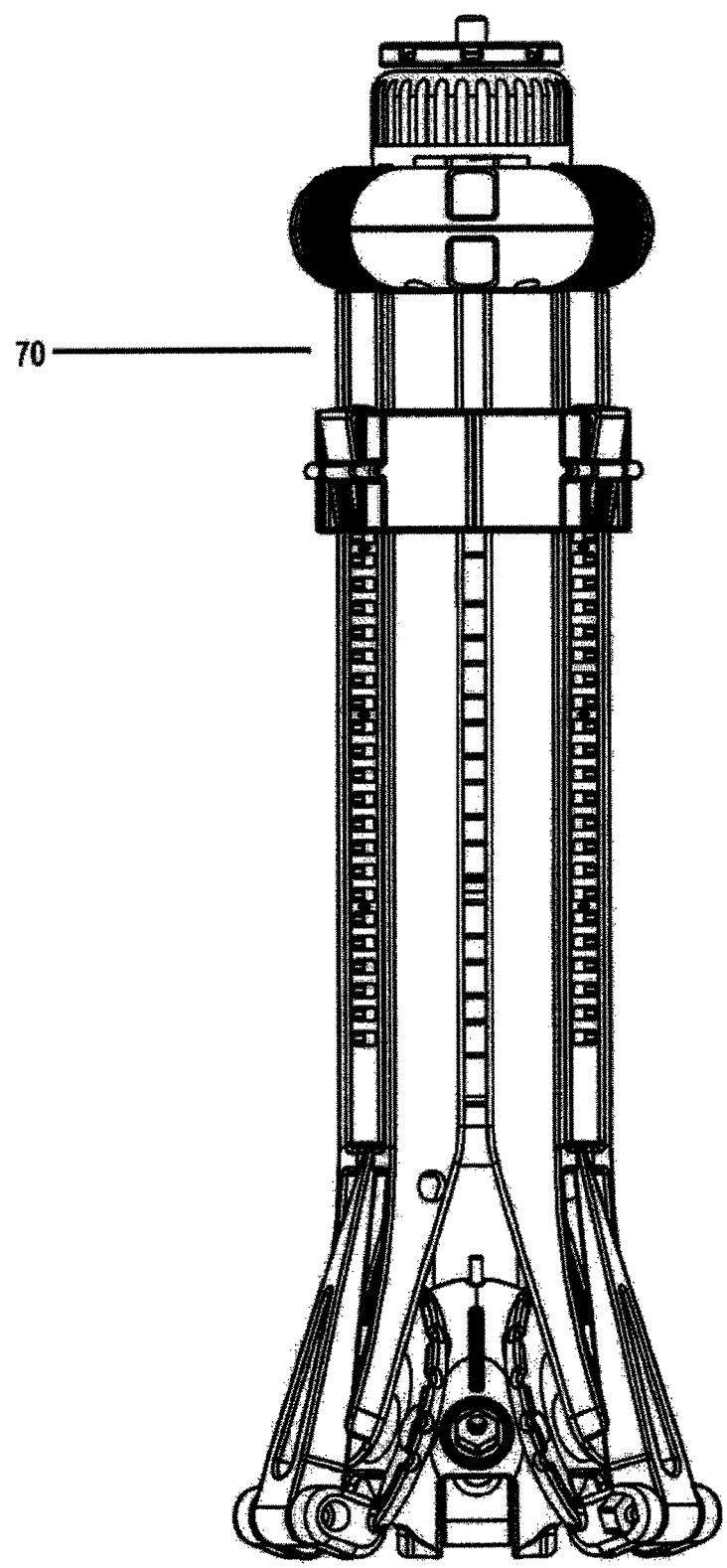
FIG. 1A is a side view of an example multipod in the form of a tripod in the closed position according to some embodiments of the present invention.
Figure 1B:
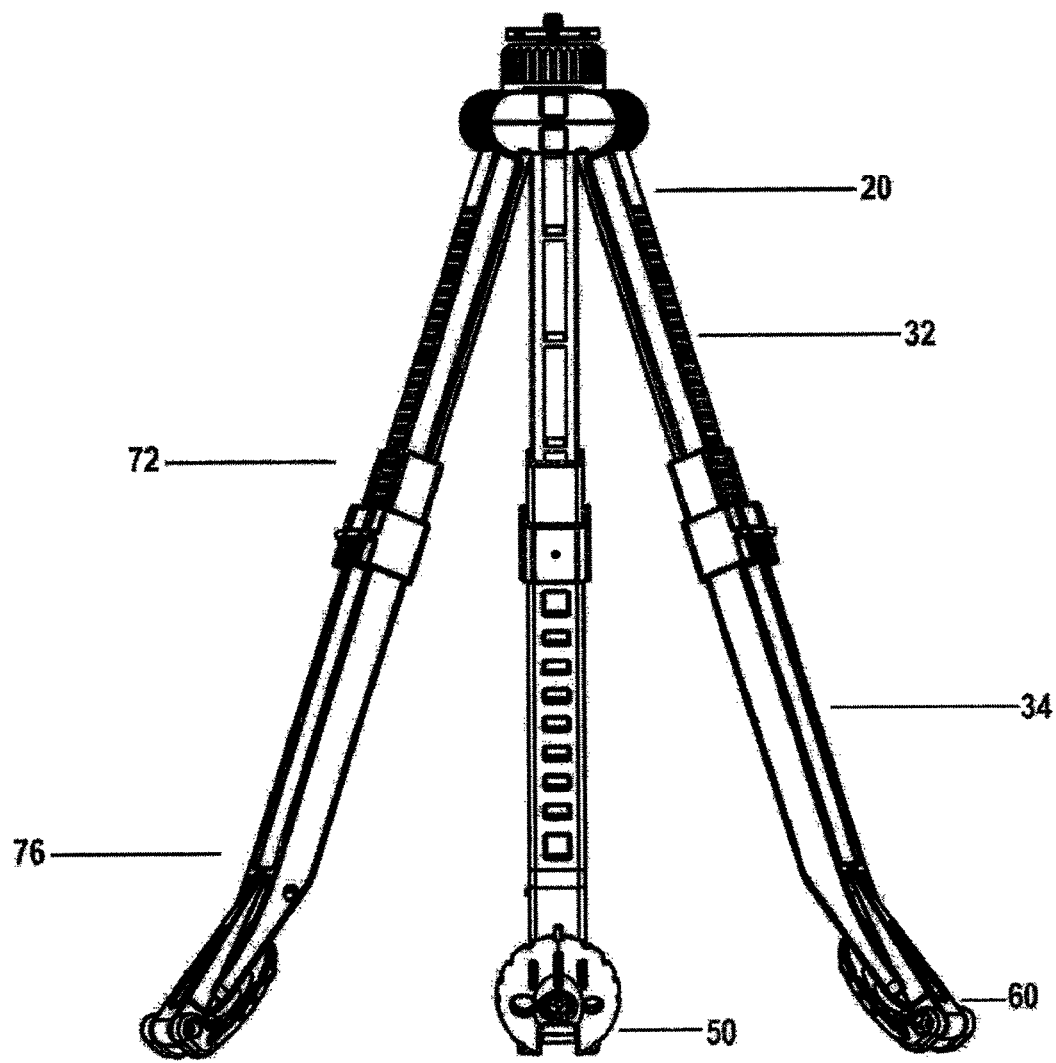
FIG. 1B is a side view in an open position and all legs extended to maximum length according to some embodiments of the present invention.
Figure 2:
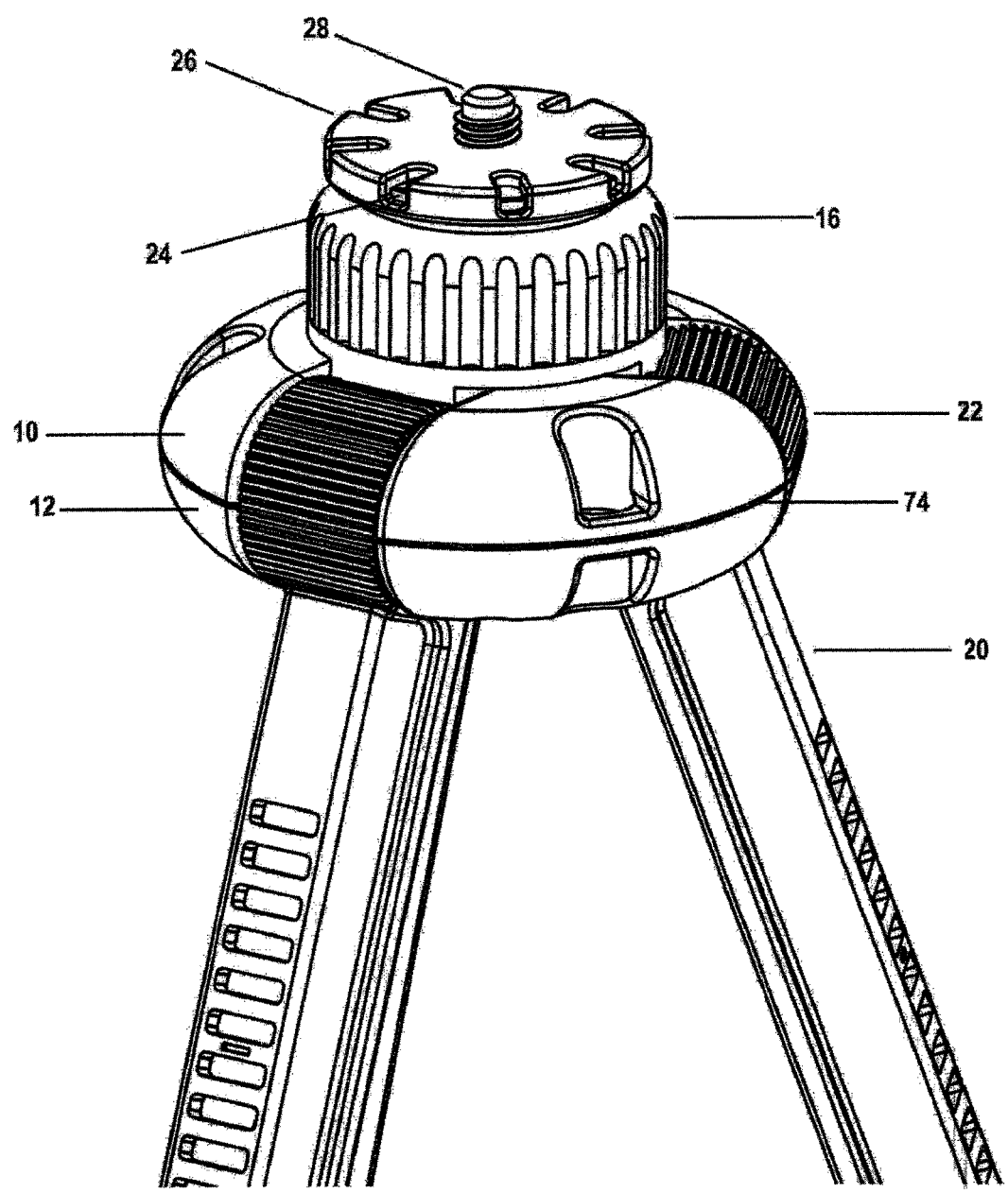
FIG. 2 is a top perspective view of the center support enclosure according to some embodiments of the present invention.
Figure 3A:
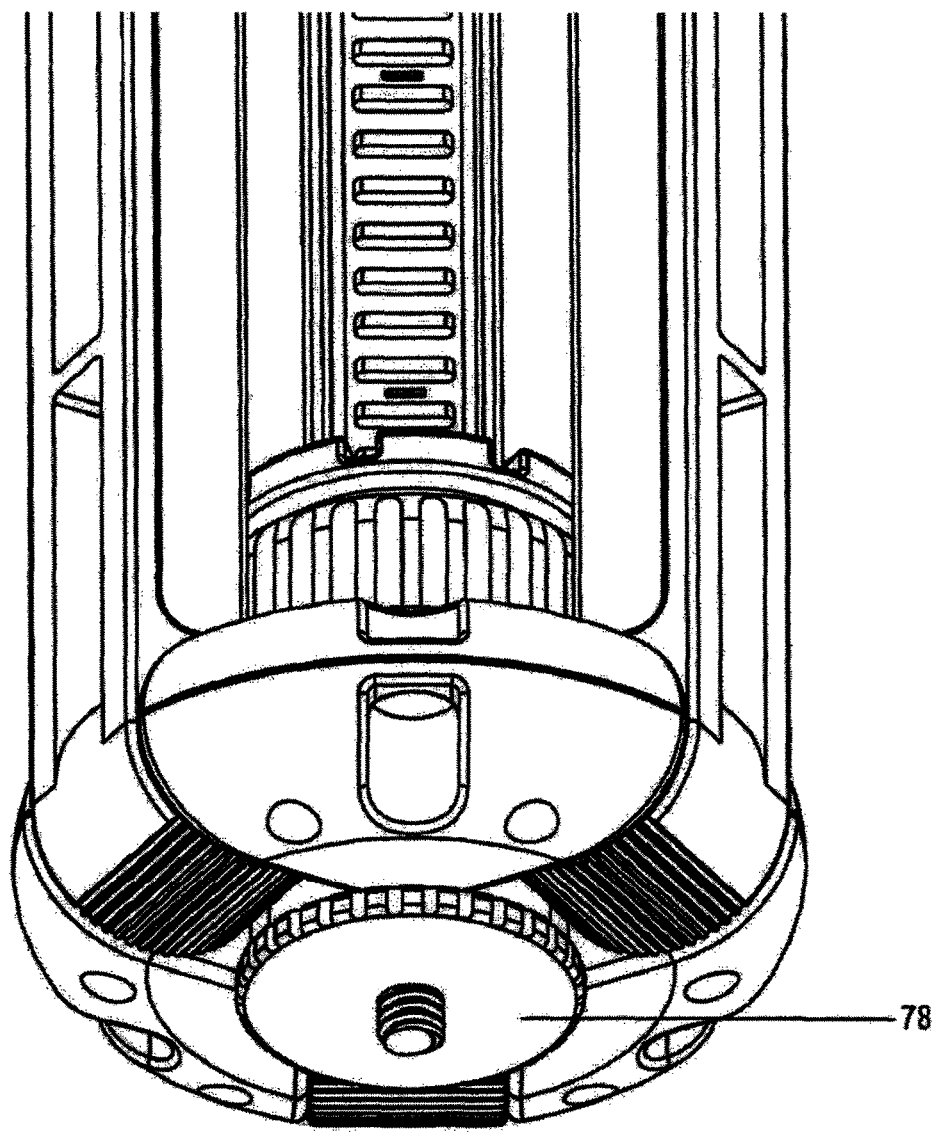
FIG. 3A is a bottom perspective view of the center support enclosure with legs folded upward according to some embodiments of the present invention.
Figure 3B:
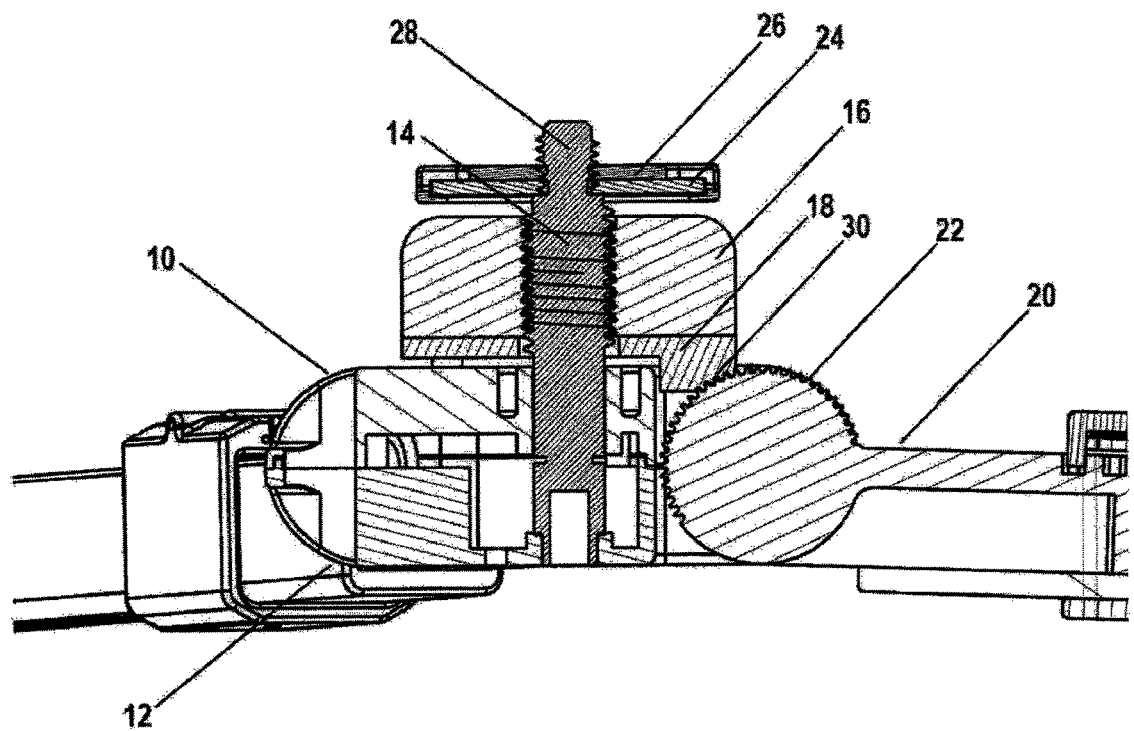
FIG. 3B is a sectional plan view of the center support enclosure according to some embodiments of the present invention.

Referring to FIGS. 1B, 2 and 3B, a multipod structure in the form of a tripod 70 in accordance with the present invention is shown and includes a clamshell base 74, a platform disk 24, a multi-threaded shaft 14 with mounting stud 28, a leg lock plate 18, a securing mechanism 16, and a plurality of legs 72. In the example described herein, the tripod 70 has such legs 72. It is to be understood that the leg configurations described herein may be used with a support structure that has two or more legs, not limited to three. The clamshell base 74 has two half shells, top clamshell base 10 and bottom clamshell base 12, connected with fasteners which, when assembled, forms a pivotable receptacle for the tripod legs 72. An upper leg section 20 of each of the legs 72 terminates in an axle configuration that pivots within the pivotable receptacle of the clamshell base 74.

The securing mechanism 16, which may be threaded, applies pressure to the leg lock plate 18 and locks each leg 72 at a desired angle. The securing mechanism 16 includes a threaded knob coupled to the multi-threaded shaft 14 but other means of applying pressure may be used including cam locks, screws or other methods. In one embodiment, the leg lock plate 18 is made of ABS plastic, but aluminum, steel or other materials may be used. The leg lock plate 18 contacts the upper leg 20 using interlocking gear teeth, but knurled surfaces, roughened surfaces, tacky rubber surfaces or other friction generating materials and methods may be used. Other components of the present invention such as, for example, the pivot plate 60, also may be formed of various materials including those used to make the leg lock plate 18.

The leg assembly 76 includes the upper leg section 20 and a lower leg section 34, a leg length adjuster collar 38, a length adjuster tab 40, leg length adjuster pin 42 and leg length adjuster spring 44. Depressing the tab 40, disengages the tab 40 from upper leg washboard track 32 allowing lower leg length adjustment. Releasing the tab 40 into any washboard track depression secures the leg in the new chosen position. The track 32 may be formed of a series of detents, raised ridges, protrusions or other shapes may be used.

Figure 5A:
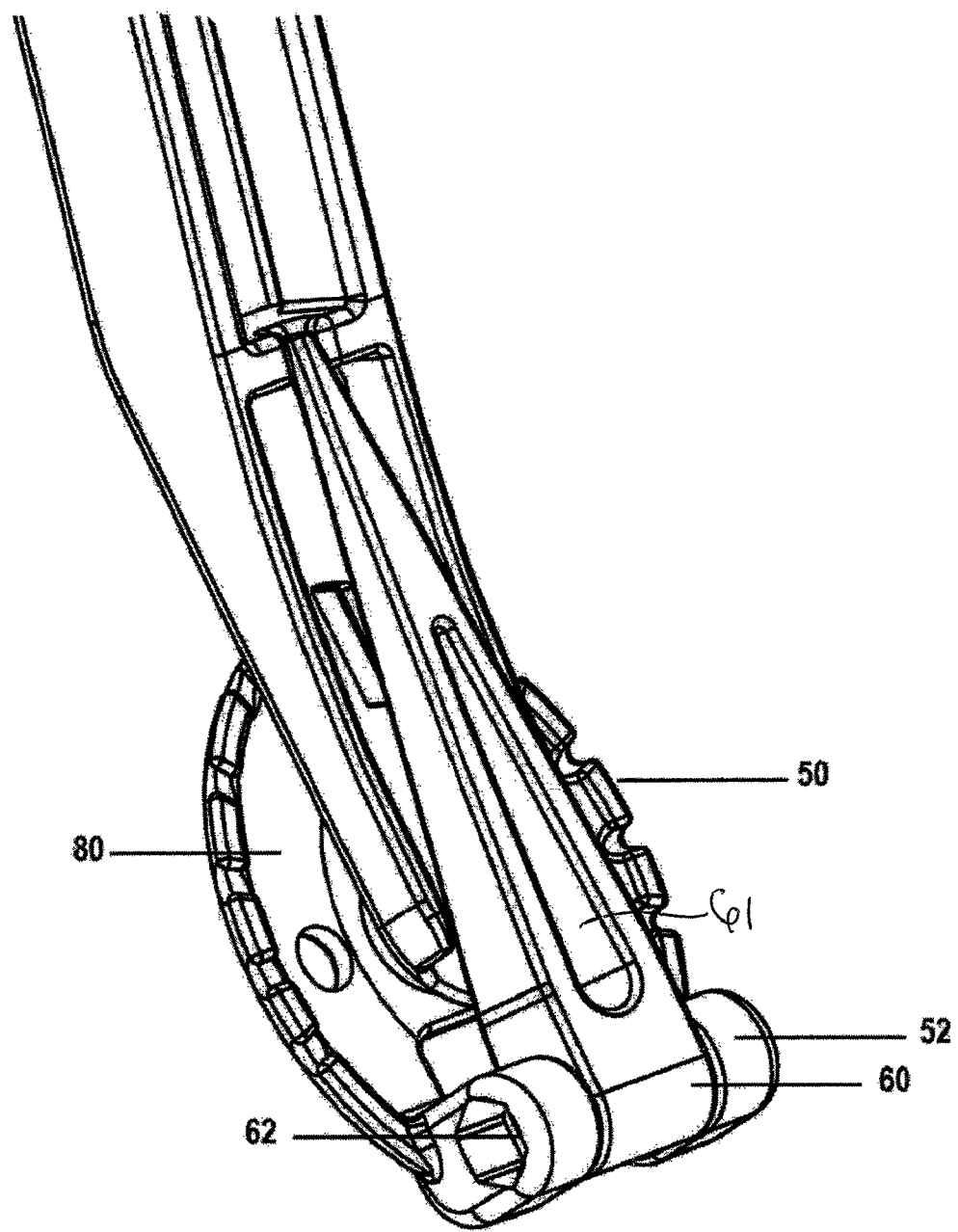
FIG. 5A is a perspective view of the leg tip, pivoting spoon foot and pivoting stake in closed position according to some embodiments of the present invention.
Figure 5B:
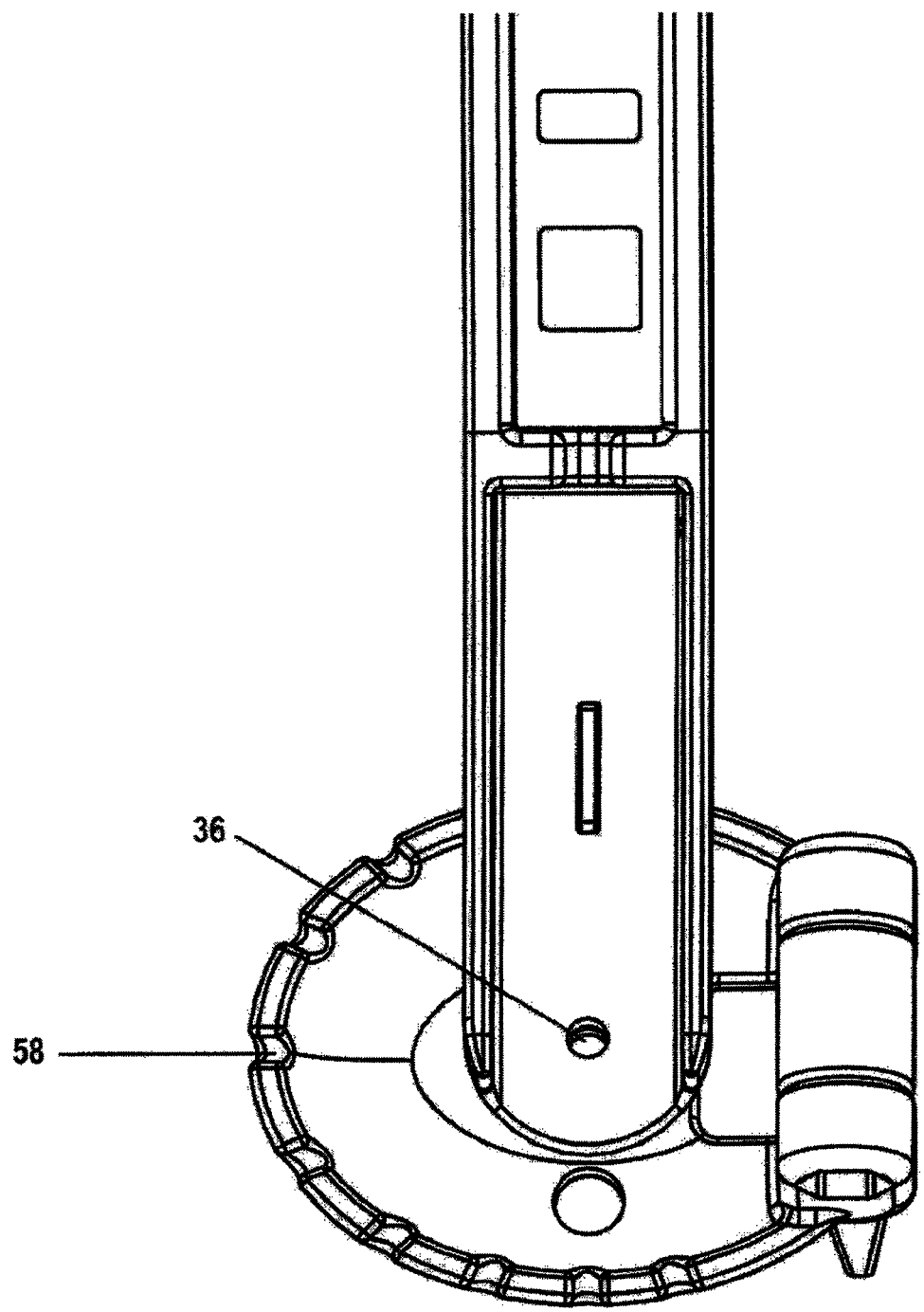
FIG. 5B is a perspective view of the leg tip with pivoting spoon foot rotated according to some embodiments of the present invention.
Figure 6:
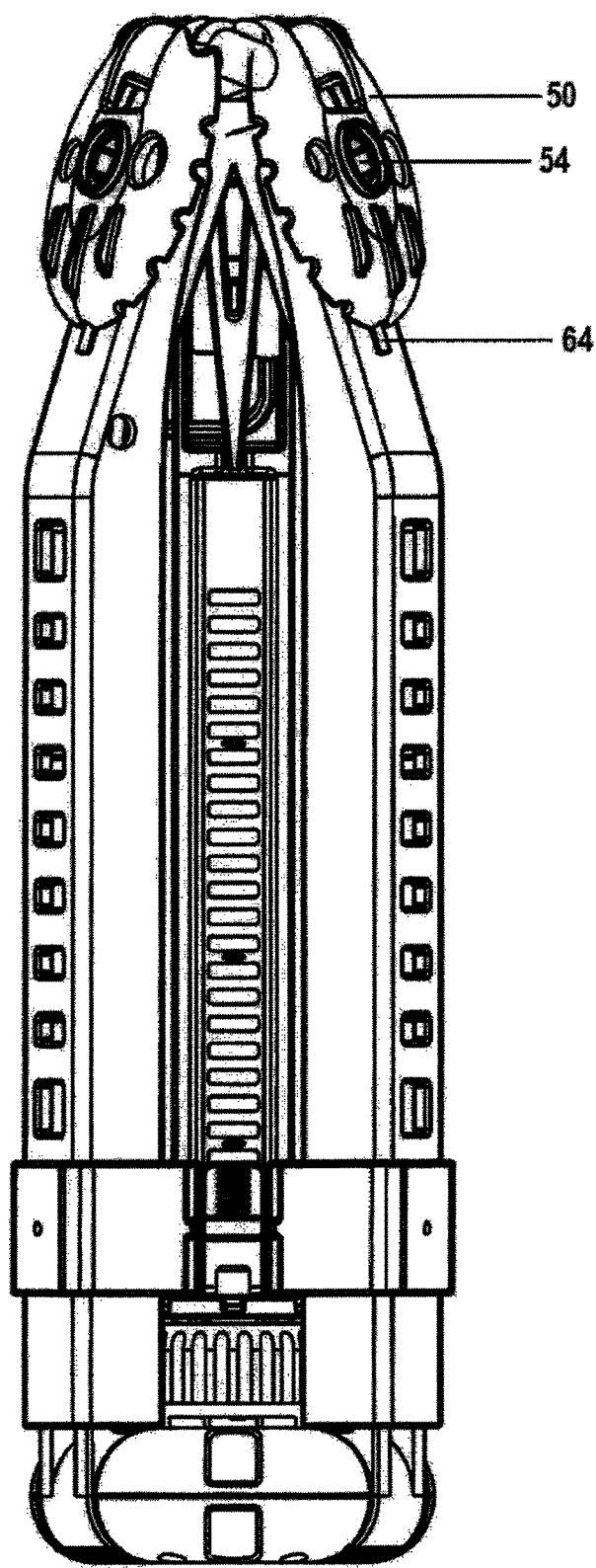
FIG. 6 is a side view of the tripod of FIG. 1A in an alternate closed position according to some embodiments of the present invention.

FIGS. 5A, 5B and 6 illustrate a spoon foot assembly 80 of the tripod 70. Spoon foot 50 is coupled to lower leg 34 with a spoon foot pivot assembly that may be, for example, a bolt and nut combination with one or more washers, at a tightness amount that allows the spoon 50 to be pivoted to various angles. Detents 58 on spoon perimeter allow for locking of the spoon at various rotational angles when a detent encounters the detent spur 64. Pivoting stake 60 is fastened to spoon foot yoke 52 with a pivoting stake fastener assembly that may be, for example, a bolt and nut combination with one or more washers, tightened to an amount that allows the stake to be rotated and set at various positions. In one embodiment the stake is made of a non-metallic material such as a plastic including ABS plastic, for example. Other materials such as metallic materials such as Aluminum, steel or other materials may be used. A secondary mounting stud 78 shown in FIG. 3B, allows for the attachment of a second camera or accessory.

Figure 5C:
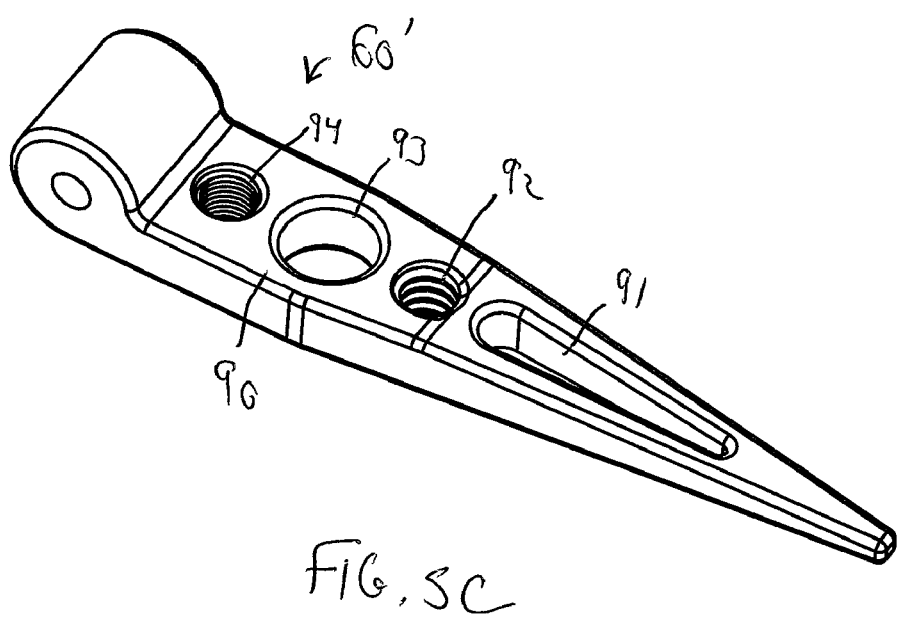
FIG. 5C is a perspective view of an alternative pivoting stake of the present invention.
Figure 50:
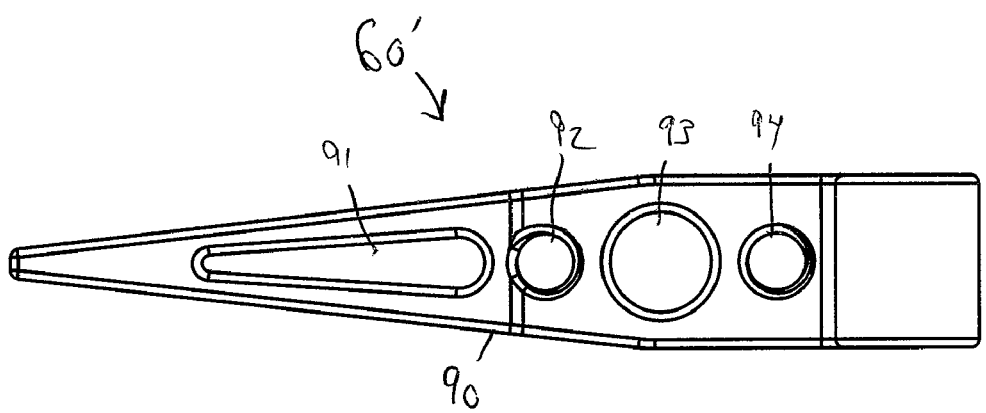
Figure 5E:
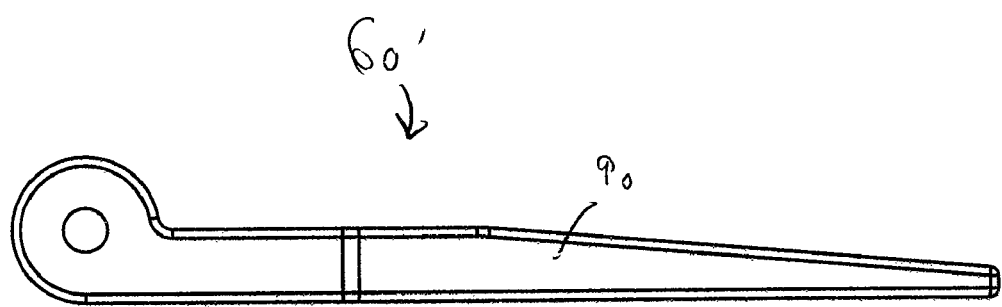
FIG. 5E is a side view of the alternative pivoting stake of FIG. 5C.

FIGS. 1A, 1B, 5A and 6 show the pivoting stake 60 as a triangular spike with an elongated teardrop slot 61 extending a substantial portion of the stake body. An alternative embodiment of the pivoting stake 60' is shown in FIGS. 5C-5E, in which a body 90 of the stake 60' includes a smaller elongated teardrop slot 91, as well as retaining ports 92-94, of which one or more may be threaded as represented by ports 92 and 94, or one or more may be unthreaded as represented by port 93. The alternative pivoting stake 60' may be used to secure the tripod 70 to a substrate, such as by screwing it using one or more threaded ports as an interface, or by bolting or other means through one or more unthreaded ports. One or more of the legs 72 may include the alternative pivoting stake 60'.

Figure 4A:
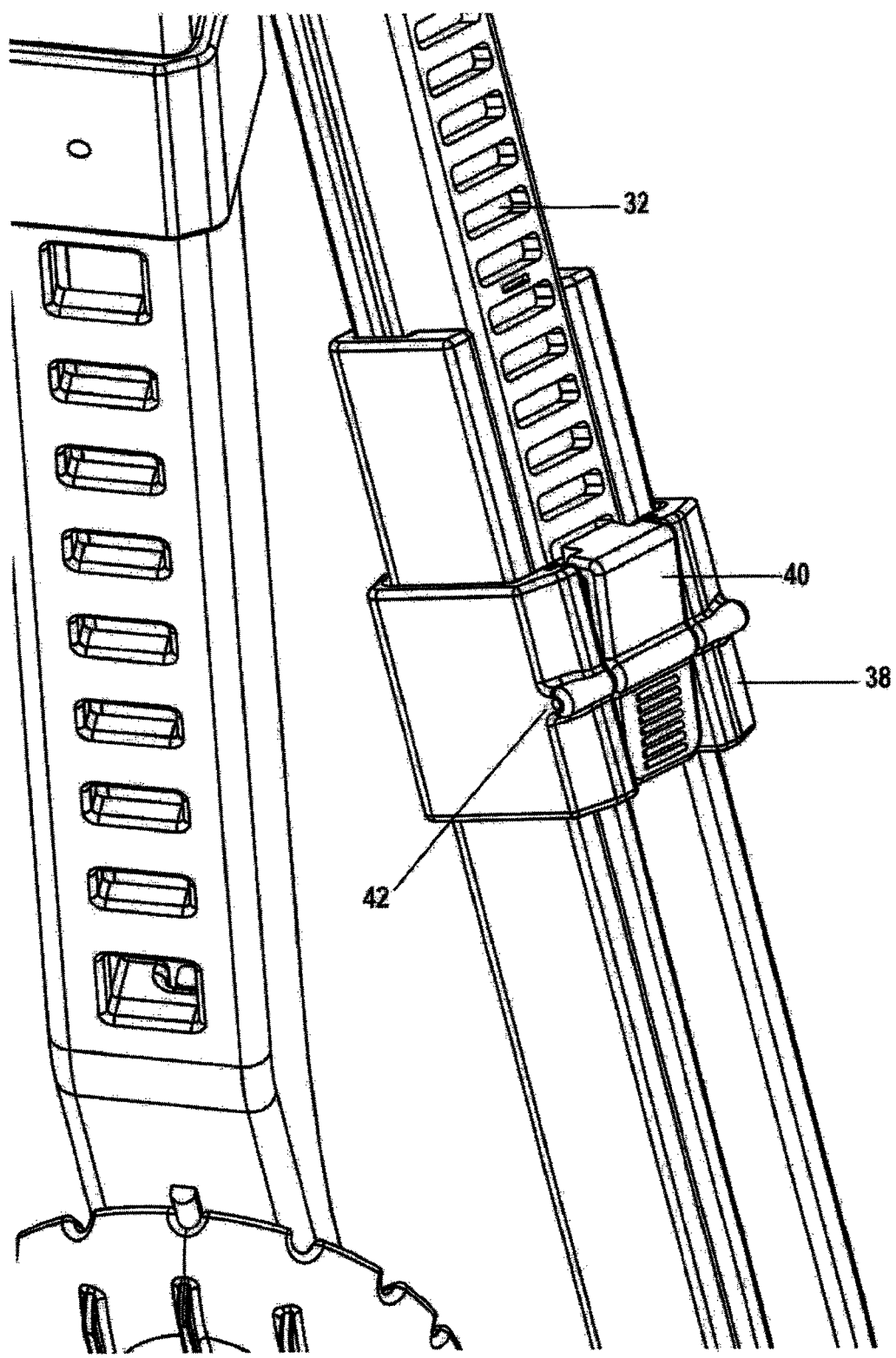
FIG. 4A is a close up of the leg length adjustment mechanism according to some embodiments of the present invention.
Figure 4B:
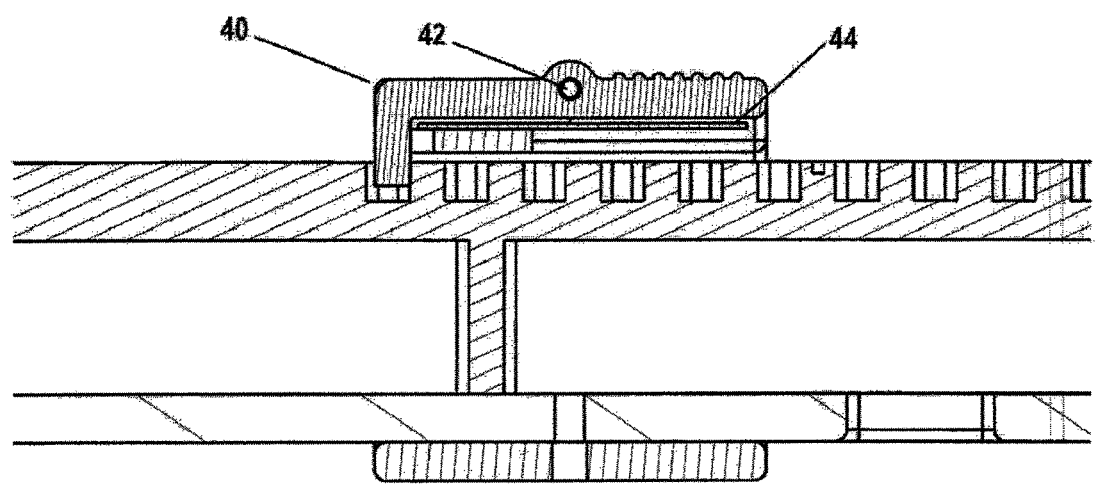
FIG. 4B is a sectional plan view of the leg length adjustment mechanism according to some embodiments of the present invention.

The matter of using the multipod of the present invention starting in a closed configuration as closed tripod 70 in FIG. 1A to support one or two cameras or accessories, is initiated by loosening the securing mechanism 16 (FIG. 3B), which allows the tripod leg assemblies 76 (FIG. 1B) to swing freely away from each other and placed in the desired position at angles independent of one another. The securing mechanism 16 is then tightened which engages the interlocking gear teeth 30 and 22, (FIG. 3B) or knurled or rough or rubber surfaces at the point of contact. Next, the leg length rocker tab 40 (FIG. 4A) is grasped with thumb and fore finger and pressed, disengaging rocker tab 40 from track 32 or detents, raised ridges, protrusions or other repeated shapes. This flexes the leg length adjuster spring 44 or rubber bumper or other spring-like device. The lower leg 34 is then extended to the desired length. The rocker tab 40 is then released and the spring 44 returns the rocker tab to the engaged position inside the selected detent, raised ridge, protrusion or other repeated shape. The spoon foot 50 (FIG. 5A) may be pivoted by slightly flexing the spoon foot material to disengage spoon foot 50 detent 58 from the detent spur 64 (FIG. 6).

After pivoting the spoon foot 50 to the desired detent 58 position, the spoon foot detent 58 is mated to the detent spur 64. The pivoting stake 60 (FIG. 5A) which is connected to the spoon foot yoke 52 with the spoon foot fastener assembly 56 may be tightened or loosened with a hex head wrench to produce the desired amount of pivot friction. Rotating the pivoting stake 60 to the desired angle is achieved by grasping the pivoting stake 60 and pulling it away from the spoon foot assembly 80 and releasing it at the desired angle. The tripod 70 may be closed in an alternate configuration (FIG. 6) by rotating the three or more tripod leg assemblies 76 to the point where the respective spoon foot yokes 52 make contact. The securing mechanism may then be tightened which engages the interlocking gear teeth 30 and 22, (FIG. 3B) or knurled or rough or rubber surfaces at the point of contact. Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

The present invention in the form of a monopod tip 100 with concealable stud 102 is shown in FIGS. 7-13. The tip 100 includes a cap section 104 and a base section 106. The cap 104 includes a tip cap 108 hingedly connected to cap body 110. The cap 104 is configured for frictional fit insertion into an interior 112 of a top side 114 of the base 106. The cap 104 may be disengaged from the base 106 in this configuration. That may be desirable if the cap 104 is to be replaced or a connector other than the concealable stud 102 is to be used on the monopod. The base 106 includes a bottom side stud 116 arranged for removable engagement with a top surface of the monopod; however, other ways for engaging the base 106 with the monopod are possible. An exterior surface 118 of the base 106 may be knurled to allow for ease or rotation of the tip 100 on the monopod, or removal of the tip 100 from the monopod.

Figure 7:
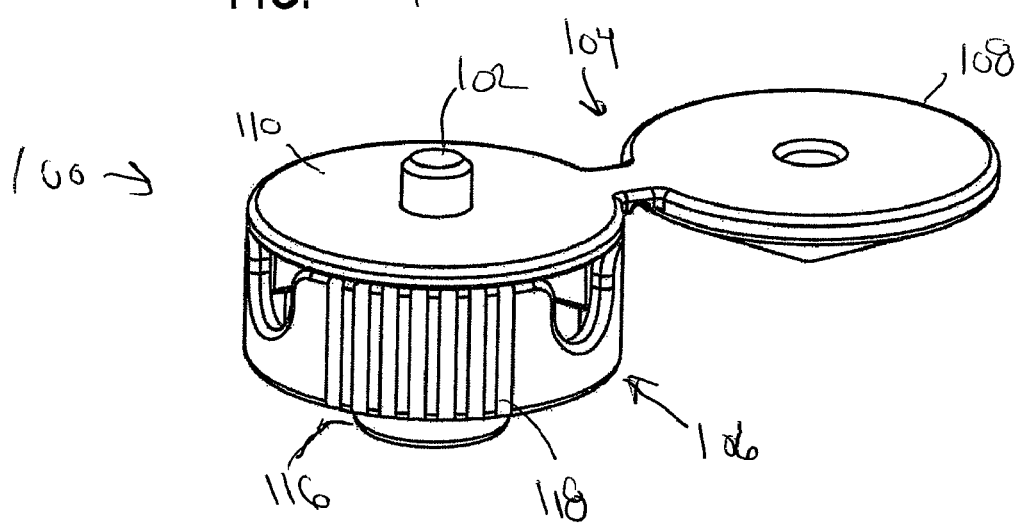
FIG. 7 is a perspective view of a monopod tip assembly of the present invention with the cover flipped out 180° and the threaded stud exposed.
Figure 8:
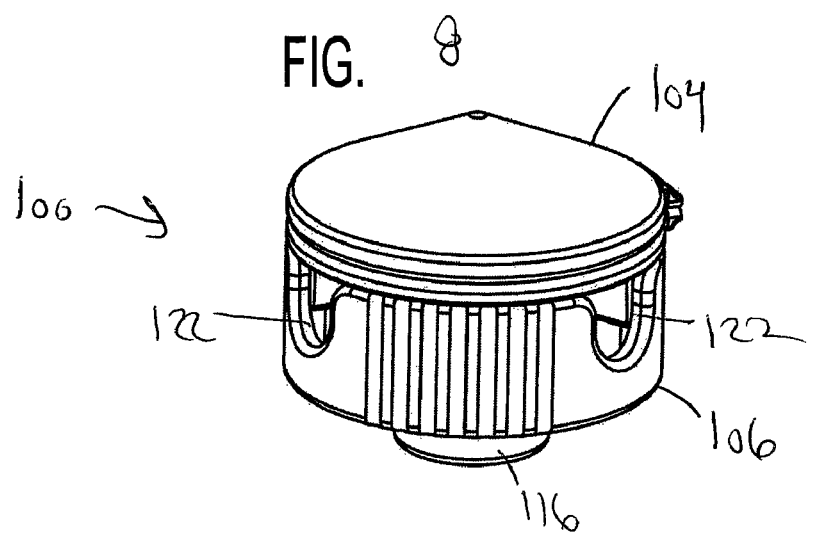
FIG. 8 is a perspective view of the monopod tip assembly with the cover closed and the threaded stud hidden.
Figure 9:
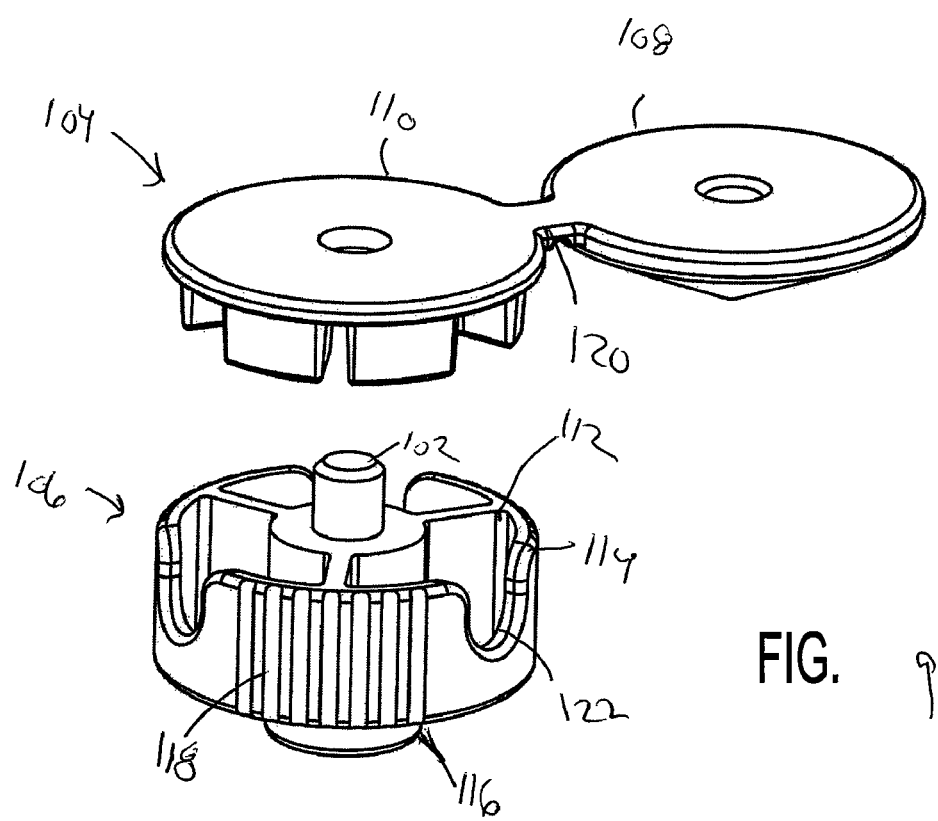
FIG. 9 is a perspective exploded view of the monopod flexible hinged cover and the monopod tip base.
Figure 10:
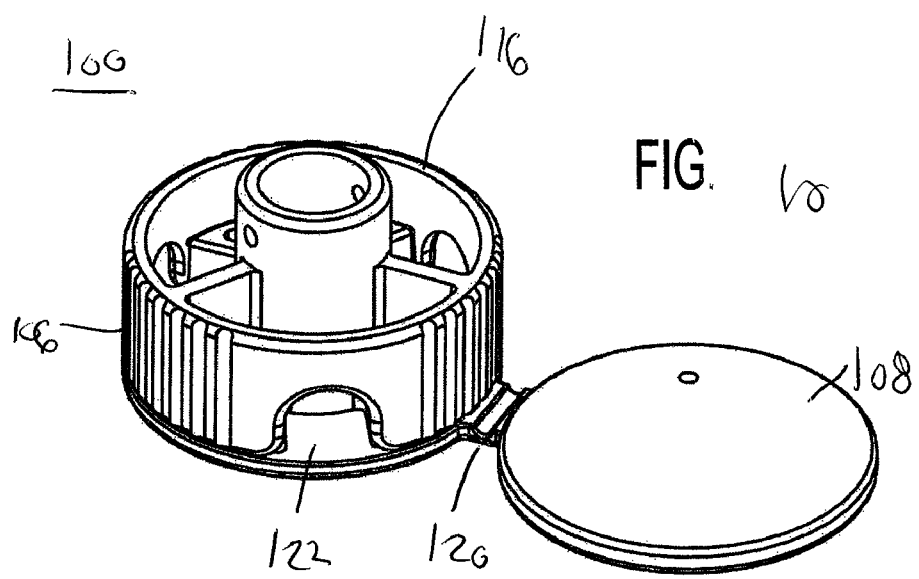
FIG. 10 a perspective view of the underside of the monopod tip base with the hinged cover flipped out 180°.
Figure 11:
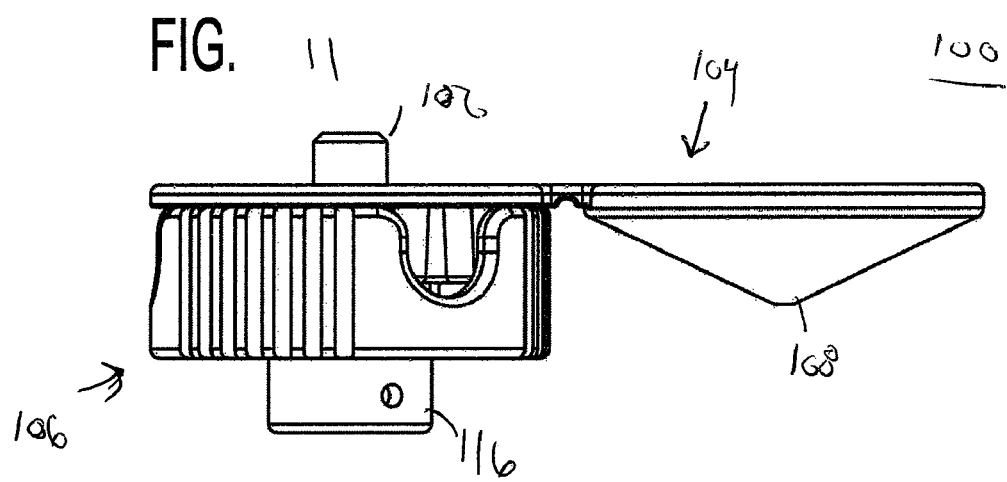
FIG. 11 is side view of the monopod tip base with the flexible cover flipped out 180°.
Figure 12:
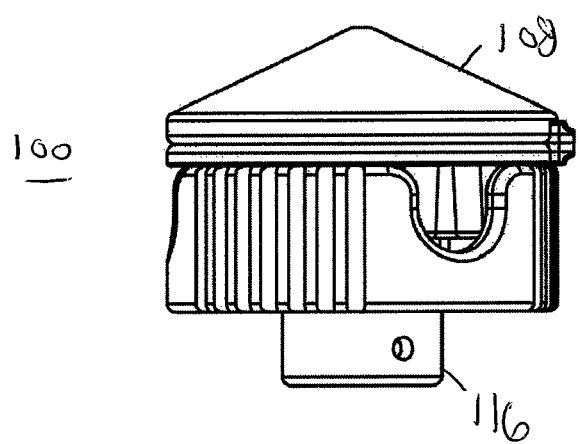
FIG. 12 is side view of the monopod tip base with the flexible cover fitted over the top of the mounting stud.
Figure 13:
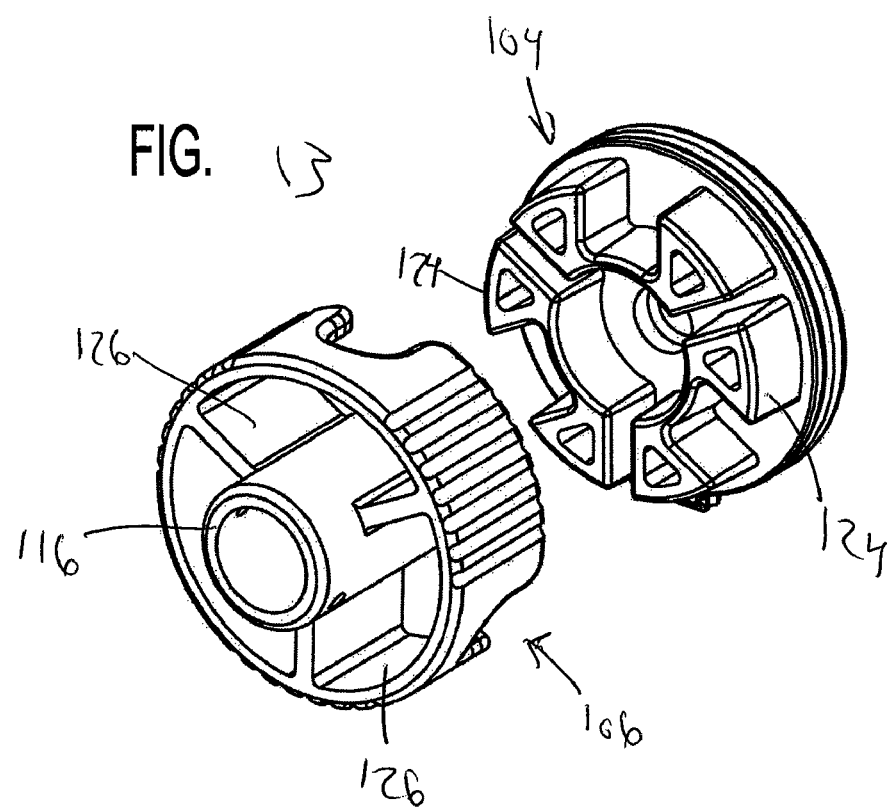
FIG. 13 is a perspective exploded view showing the attachment protrusions of the flexible cover which mates with the monopod tip base.

FIG. 7 shows the monopod tip 100 with the cap flipped off and away to reveal the concealable stud 102. FIG. 8 shows the monopod tip 100 with the tip cap 108 secured so that the tip cap 108 covers the stud 102. FIG. 9 shows the cap section 104 removed from the base section 106. The tip cap 108 is hingedly connected to the cap body 110 so that it is tethered to the cap body 110, such as with a pliable or flexible material such as a thin and/or soft plastic material in the form of anchor interface 120. FIG. 10 shows a base portal 122, of which there may be one or more around the perimeter of the base section 106. The base portals 122 are configured to allow for the passage of string, line, rope, elastic, bungee and other flexible materials to secure the monopod tip 102 to the monopod when deployed on the monopod. FIG. 11 is a side view of the monopod tip 100 with the tip cap 108 flipped out 180°. FIG. 12 is a side view of the tip cap 108 secured to the stud 102. FIG. 13 is an exploded view of the underside of the cap section 104 and the base section 106. The underside of the cap section 104 includes engagement wedges 124 arranged for frictional fitting into cavities 126 of the base section 106 when the two sections are pressed together during assembly. Other mechanisms for permanently or removably securing the cap section 104 and the base section 106 together are possible.

While example embodiments of the present invention have been shown and described, it will be understood that various modifications and changes could be made thereunto without departing from the spirit and scope of the invention as defined by the following claims.

What is claimed is:

1. An apparatus for supporting a component, the apparatus comprising:
   a. a plurality of legs, each of the plurality of legs formed as a leg assembly wherein each leg assembly includes an upper leg section and a lower leg section;
   b. a base coupled to the upper leg sections of the plurality of legs and including a leg lock plate; and
   c. a securing mechanism engaged with the leg lock plate of the base and configured to apply pressure to the leg lock plate so as to secure each of the plurality of legs at a desirable angle,
   wherein the leg lock plate engages the upper leg with interlocking gear teeth.

2. The apparatus of claim 1 wherein the securing mechanism is engaged with the leg lock plate through a rotatable shaft and wherein the securing mechanism is a threaded knob coupled to the rotatable shaft.

3. The apparatus of claim 1 further comprising for each lower leg section of each leg assembly a spoon foot.

4. The apparatus of claim 3 wherein each spoon foot is coupled to the lower leg with a spoon foot pivot assembly that is configured to allow the spoon foot to be pivoted to various angles.

5. The apparatus of claim 3 further comprising a pivot stake coupled to each spoon foot.

6. The apparatus of claim 5 wherein the pivot stake is a triangular spike with an elongated teardrop slot.

7. The apparatus of claim 5 the pivot stake is a triangular spike with an elongated teardrop slot and a plurality of retaining ports.

8. The apparatus of claim 7 wherein the plurality of retaining ports includes one or more threaded ports and one or more unthreaded ports.

9. An apparatus for supporting a component, the apparatus comprising:
   a. a plurality of legs, each of the plurality of legs formed as a leg assembly wherein each leg assembly includes an upper leg section and a lower leg section;
   b. a base coupled to the upper leg sections of the plurality of legs and including a leg lock plate; and
   c. a securing mechanism engaged with the leg lock plate of the base and configured to apply pressure to the leg lock plate so as to secure each of the plurality of legs at a desirable angle,
   wherein the base is a clamshell base formed of a top clamshell base and a bottom clamshell base.

10. The apparatus of claim 9 wherein the clamshell base forms a pivotable receptacle for each of the plurality of legs.

11. The apparatus of claim 9 wherein the upper leg section of each of the plurality of legs terminates in an axle configuration that is pivotable within the clamshell base.

12. An apparatus for supporting a component, the apparatus comprising:
   a. a plurality of legs, each of the plurality of legs formed as a leg assembly wherein each leg assembly includes an upper leg section and a lower leg section;
   b. a base coupled to the upper leg sections of the plurality of legs and including a leg lock plate; and
   c. a securing mechanism engaged with the leg lock plate of the base and configured to apply pressure to the leg lock plate so as to secure each of the plurality of legs at a desirable angle,
   wherein each of the leg assemblies further includes an upper leg washboard track, a leg length adjuster collar, a length adjuster tab, a leg length adjuster pin and a leg length adjuster spring.

13. The apparatus of claim 12 wherein each of the upper leg washboard tracks includes a plurality of depressions and wherein the leg assemblies are operated by depressing the tab to disengage the tab from the upper leg washboard track allowing for lower leg length adjustment and releasing the tab into a selectable one of the washboard track depression to secure the leg in a chosen position.

14. The apparatus of claim 13 wherein the upper leg washboard track may be formed by any of a series of detents, raised ridges or protrusions.

* * * * *